(12) United States Patent
Yang et al.

(10) Patent No.: US 10,808,940 B2
(45) Date of Patent: Oct. 20, 2020

(54) COOKING EQUIPMENT RUNNING METHOD AND DEVICE

(71) Applicant: Beijing Xiaomi Mobile Software Co., Ltd., Haidian District, Beijing (CN)

(72) Inventors: Haijun Yang, Beijing (CN); Xiangxuan Kong, Beijing (CN); Enxing Hou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 152 days.

(21) Appl. No.: 15/482,826

(22) Filed: Apr. 10, 2017

(65) Prior Publication Data

US 2017/0370595 A1 Dec. 28, 2017
US 2020/0292176 A9 Sep. 17, 2020

(30) Foreign Application Priority Data

Jun. 28, 2016 (WO) .............. WOX/CN2016/089397

(51) Int. Cl.
*H05B 3/02* (2006.01)
*H05B 3/68* (2006.01)
(Continued)

(52) U.S. Cl.
CPC .............. *F24C 7/08* (2013.01); *A47J 36/321* (2018.08); *A47J 37/1266* (2013.01);
(Continued)

(58) Field of Classification Search
CPC .... A47J 2203/00; A47J 27/62; A47J 37/1266; A47J 41/0094; F24C 7/006; F24C 7/08
(Continued)

(56) References Cited

U.S. PATENT DOCUMENTS 4,644,137 A * 2/1987 Asahi ...................... A47J 27/62
219/497
6,028,297 A * 2/2000 Hamada .................. A47J 27/04
219/497
(Continued)

FOREIGN PATENT DOCUMENTS

CN 101366484 A 2/2009
CN 103196165 A 7/2013
(Continued)

OTHER PUBLICATIONS

International Search Report in international application No. PCT/CN2016/087397, dated Apr. 1, 2017.
(Continued)

*Primary Examiner* — Sang Y Paik
(74) *Attorney, Agent, or Firm* — Jun He Law Offices P.C.; James J. Zhu

(57) ABSTRACT

A cooking equipment running method and device are provided, and relate to the technical field of terminals. The method includes: a current running mode is acquired if it is detected that a water level of cooking equipment exceeds a preset water level during a running process of the cooking equipment; a target running mode is determined according to the current running mode, heating power in the target running mode being less than heating power in the current running mode; and the current running mode is switched to the target running mode.

19 Claims, 5 Drawing Sheets

(51) Int. Cl.
*F24C 7/08* (2006.01)
*A47J 41/00* (2006.01)
*A47J 37/12* (2006.01)
*A47J 36/32* (2006.01)
*F24C 7/00* (2006.01)

(52) U.S. Cl.
CPC .......... *A47J 41/0094* (2013.01); *F24C 7/006* (2013.01); *A47J 2203/00* (2013.01)

(58) Field of Classification Search
USPC .......... 219/438–442, 443.1–468.2, 507–518
See application file for complete search history.

(56) References Cited

U.S. PATENT DOCUMENTS

| | | | | |
|---|---|---|---|---|
| 6,283,014 | B1 * | 9/2001 | Ng | A47J 27/0802 219/431 |
| 2003/0159592 | A1 | 8/2003 | Ryoichi et al. | |
| 2009/0166350 | A1 * | 7/2009 | Ho | A47J 27/21041 219/441 |
| 2010/0326286 | A1 | 12/2010 | Romero et al. | |
| 2015/0044965 | A1 | 2/2015 | Kamon et al. | |
| 2017/0000282 | A1 * | 1/2017 | Li | A47J 43/04 |

FOREIGN PATENT DOCUMENTS

| | | |
|---|---|---|
| CN | 104635541 A | 5/2015 |
| CN | 105078198 A | 11/2015 |
| GB | 2470368 A | 11/2010 |
| WO | 2009109920 A1 | 9/2009 |
| WO | 2010133824 A1 | 11/2010 |
| WO | 2015132136 A1 | 9/2015 |

OTHER PUBLICATIONS

The Written Opinion of the International Search Authority in international application No. PCT/CN2016/087397, dated Apr. 1, 2017.

Supplementary European Search Report in European application No. 17162821.7, dated Nov. 7, 2017.

English translation of the Written Opinion of the International Search Authority of PCT Application No. PCT/CN2016/087397, dated Apr. 1, 2017.

* cited by examiner

US 10,808,940 B2

COOKING EQUIPMENT RUNNING METHOD AND DEVICE

CROSS-REFERENCE TO RELATED APPLICATIONS

This application is filed based upon and claims priority to PCT Application No. PCT/CN2016/087397, filed on Jun. 28, 2016, the entire contents of which are incorporated herein by reference.

TECHNICAL FIELD

The present disclosure generally relates to the technical field of terminals, and more particularly, to a cooking equipment running method and device.

BACKGROUND

Along with development of sciences and technologies, cooking equipment is developed to be increasingly smart. For example, an electric rice cooker is common cooking equipment, and has multiple functions of "rice steaming", "congee cooking" and the like, and a user may select any function to cook food.

Different functions of the electric rice cooker correspond to different running modes, and for example, a running mode corresponding to the "rice steaming" function is keeping heating for a preset time and then stopping heating. A running mode corresponding to the "congee cooking" function is intermittent heating for avoiding overflow caused by continuous heating. When starting operation of the user is detected, the electric rice cooker runs according to a running mode corresponding to a function selected by the user.

SUMMARY

According to a first aspect, there is provided a cooking equipment running method. The method includes: a current running mode is acquired if it is detected that a water level of cooking equipment exceeds a preset water level during a running process of the cooking equipment; a target running mode is determined according to the current running mode, heating power in the target running mode being less than heating power in the current running mode; and the current running mode is switched to the target running mode.

According to a second aspect, there is provided a cooking equipment running method. The method includes: a running mode is acquired when a remote starting operation to cooking equipment is detected; a running instruction is generated according to the running mode, the running instruction carrying the running mode; and the running instruction is sent to the cooking equipment for the cooking equipment to run in the running mode.

According to a third aspect, there is provided a cooking equipment running device. The device includes: a processor; and a memory configured to store instruction executable by the processor, wherein the processor may be configured to: acquire a current running mode if it is detected that a water level of cooking equipment exceeds a preset water level during a running process of the cooking equipment; determine a target running mode according to the current running mode, heating power in the target running mode being less than heating power in the current running mode; and switch the current running mode to the target running mode.

It is to be understood that both the foregoing general descriptions and following detailed descriptions are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

In order to make the purpose, technical solutions and advantages of the present disclosure clearer, implementation modes of the present disclosure will be further described below with reference to the accompanying drawings in detail.

Figure 1:
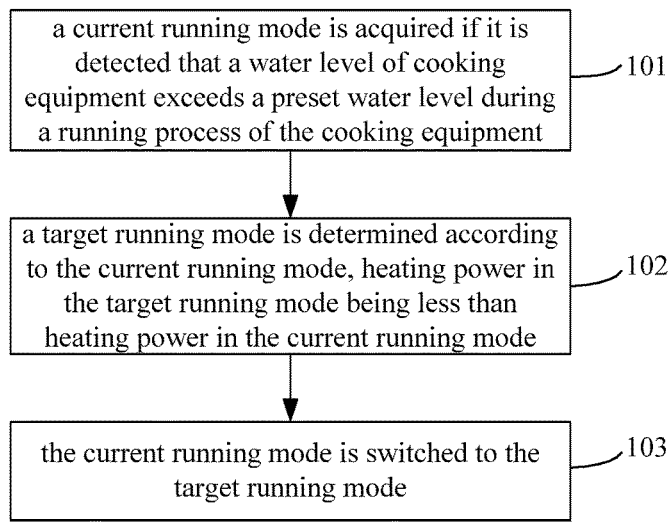
FIG. 1 is a flow chart showing a cooking equipment running method, according to an exemplary embodiment.

FIG. 1 is a flow chart showing a cooking equipment running method, according to an exemplary embodiment, and as shown in FIG. 1, the method is adopted for cooking equipment, and includes the following steps:

Step 101: a current running mode is acquired if it is detected that a water level of the cooking equipment exceeds a preset water level during a running process of the cooking equipment;

Step 102: a target running mode is determined according to the current running mode, heating power in the target running mode being less than heating power in the current running mode; and Step 103: the current running mode is switched to the target running mode.

According to the method provided by the embodiment of the present disclosure, when the water level of the cooking equipment exceeds the preset water level, that is, overflow is about to occur in the cooking equipment, the running mode in which the heating power is less than the heating power in the current running mode is adopted for running, so that a purpose of avoiding overflow of the cooking equipment is achieved, and adjustability of the running mode is high.

In a possible implementation mode, the step that the target running mode is determined according to the current running mode includes that:

the heating power in the current running mode is determined, and a running mode in which heating power is less than the heating power in the current running mode in a plurality of stored running modes is determined as the target running mode.

Alternatively, a running mode to be switched corresponding to the current running mode in a stored mode switching list is determined according to the current running mode, and the running mode to be switched is determined as the target running mode. The mode switching list is configured to store a plurality of running modes and a running mode to be switched corresponding to each of the plurality of running modes.

In a possible implementation mode, the method further includes that: a running instruction sent by a terminal is received, the running instruction carrying a running mode for instructing the cooking equipment to start; and the cooking equipment is enabled to run in the running mode.

In a possible implementation mode, the method further includes that: a prompt that reminds a user that the cooking equipment is about to overflow is generated when a preset condition is met; and the prompt is sent to the terminal.

In a possible implementation mode, when the preset condition is that the water level exceeds the preset water level, the prompt is a first message that reminds the user to check the cooking equipment.

Alternatively, when the preset condition is that the number of times that the water level is detected to exceed the preset water level exceeds a preset threshold value within a preset time period, the prompt is a second message carrying the current running mode and mode switching prompting information.

In a possible implementation mode, after the step that the prompt is sent to the terminal, the method further includes that: a mode setting instruction of the terminal is received, the mode setting instruction carrying the target running mode and the mode setting instruction being generated by the terminal according to a setting operation by the user; and the current running mode is switched to the target running mode according to the mode setting instruction.

In a possible implementation mode, the method further includes that: a working state of the cooking equipment is acquired, the working state including an idle state, a normal running state and a failure state and the normal running state including the current running mode of the cooking equipment; and the working state is sent to the terminal.

In a possible implementation mode, the terminal has a binding relationship with the cooking equipment.

In a possible implementation mode, after the step that the current running mode is switched to the target running mode for running, the method further includes that: the cooking equipment is switched from the target running mode back to the original running mode for running when it is detected that the water level drops below the preset water level.

In a possible implementation mode, after the step that the target running mode is determined, the method further includes that: a first running duration that the cooking equipment has run in the current running mode and a second running duration indicated by the target running mode are acquired; a difference between the second running duration and the first running duration is determined as a third running duration; and correspondingly, after the step that the current running mode is switched to the target running mode, the method further includes that: running is stopped if a running duration reaches the third running duration during a process of running in the target running mode.

All of the optional technical solutions may be freely combined to form optional embodiments of the present disclosure, which will not be elaborated herein one by one.

Figure 2:
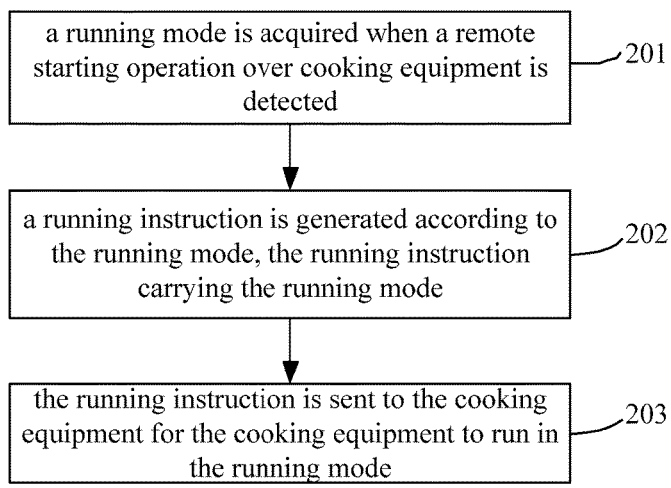
FIG. 2 is a flow chart showing a cooking equipment running method, according to an exemplary embodiment.

FIG. 2 is a flow chart showing a cooking equipment running method, according to an exemplary embodiment, and as shown in FIG. 2, the method is adopted for a terminal, and includes the following steps:

Step 201: a running mode is acquired when a remote starting operation to cooking equipment is detected;

Step 202: a running instruction is generated according to the running mode, the running instruction carrying the running mode; and Step 203: the running instruction is sent to the cooking equipment for the cooking equipment to run in the running mode.

According to the method provided by the embodiment of the present disclosure, the running instruction is sent to the cooking equipment to control the running mode of the cooking equipment, so that controllability of the cooking equipment is improved.

In a possible implementation mode, the step that the running mode is acquired includes that: a running mode selected by a user is acquired in a plurality of stored running modes; or, a pre-stored running mode is acquired.

In a possible implementation mode, the method further includes that: a prompt that reminds the user that the cooking equipment is about to overflow is received from the cooking equipment; and the prompt is displayed.

In a possible implementation mode, the prompt is a first message that reminds the user to check the cooking equipment, and the method further includes that: the prompt is displayed when the prompt is received.

In a possible implementation mode, the prompt is a second message that carries the current running mode of the cooking equipment and mode switching prompting information, and the method further includes that: the current running mode and the mode switching prompting information are displayed when the prompt is received; a target running mode selected by the user is acquired when a setting operation by the user to the running mode is detected; a mode setting instruction is generated according to the target running mode, the mode setting instruction carrying the target running mode; and the mode setting instruction is sent to the cooking equipment for the cooking equipment to switch to the target running mode according to the mode setting instruction and to run in the target running mode.

In a possible implementation mode, the method further includes that: a working state of the cooking equipment is received; working state prompting information is generated on the basis of the working state; and the working state prompting information is displayed.

In a possible implementation mode, the cooking equipment has a binding relationship with the terminal.

All of the optional technical solutions may be freely combined to form optional embodiments of the present disclosure, which will not be elaborated herein one by one.

Figure 3:
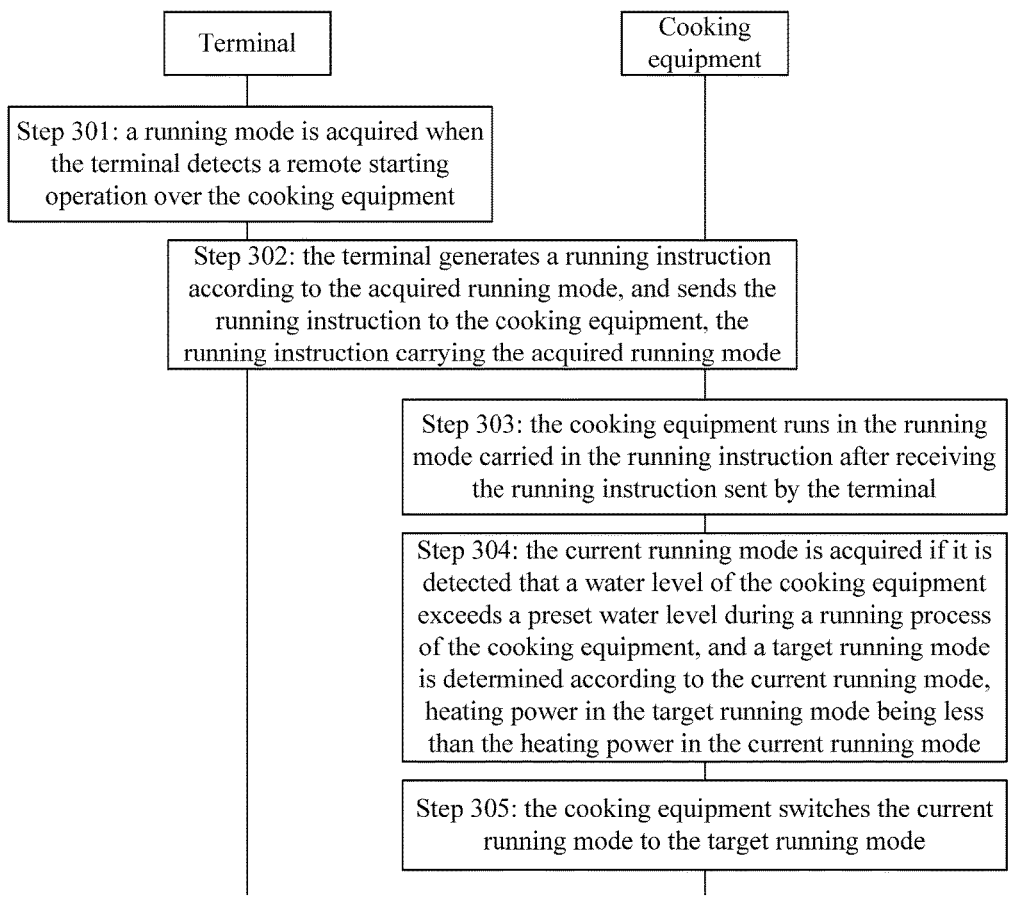
FIG. 3 is a flow chart showing a cooking equipment running method, according to an exemplary embodiment.

FIG. 3 is a flow chart showing a cooking equipment running method, according to an exemplary embodiment, interaction main bodies are cooking equipment and a terminal, and as shown in FIG. 3, the method includes the following steps.

Step 301: a running mode is acquired when the terminal detects a remote starting operation to the cooking equipment.

Wherein, the cooking equipment may be food cooking equipment such as an electric rice cooker, an automatic rice cooker and a pressure cooker, which is not specifically limited in the embodiment of the present disclosure.

In the embodiment of the present disclosure, the terminal and the cooking equipment both support a Wireless Fidelity (WiFi) technology, and the terminal may establish an indirect connection with the cooking equipment through a WiFi. Specifically, the terminal establishes a connection with a server through the WiFi, the cooking equipment establishes a connection with the server through the WiFi, and the server, as an information transferrer, sends information received from one end to the other end. In addition, the terminal may also establish a connection with the cooking equipment on the basis of a manner such as a BlueTooth (BT) or Near Field Communication (NFC) technology, which is not specifically limited in the embodiment of the present disclosure.

After the terminal establishes the connection with the cooking equipment, a user may remotely control the cooking equipment through the terminal. Remote control includes starting of the cooking equipment, running mode setting and the like, which is not specifically limited in the embodiment of the present disclosure. Specifically, the terminal may display a cooking equipment control interface, operable options, such as a starting option and a running mode a setting operation, for the cooking equipment may be displayed in the cooking equipment control interface, the user may execute a remote control operation on the cooking equipment through the cooking equipment control interface, and for example, the user triggers the starting option to execute a remote starting operation and the like on the cooking equipment. Wherein, running modes of the cooking equipment include a running stopping mode, and when the acquired running mode is the running stopping mode, the cooking equipment is indicated to stop running.

Wherein, when the terminal detects triggering operation to the starting option, it is determined that the remote starting operation to the cooking equipment is detected, and the following two manners may be adopted to acquire the running mode.

First, a running mode selected by the user is acquired in a plurality of running modes of the cooking equipment.

It is noted that the multiple running modes of the cooking equipment may be displayed in the cooking equipment control interface of the terminal, and the user may select any running mode from the multiple running modes. The terminal detects whether the user selects a running mode or not when detecting the remote starting operation to the cooking equipment, if YES, confirms that the user is expected to start the cooking equipment according to the selected running mode and determines the running mode selected by the user as a running mode in which the cooking equipment is started, and if NO, may display a running mode selection prompt for the user to select a running mode.

Second, a pre-stored running mode is acquired.

Wherein, the pre-stored running mode may be a default running mode, and may also be a running mode which is selected by the user during execution of last remote starting operation. Wherein, the default running mode may be preset by the terminal, or may be preset or modified by the terminal according to selection operation of the user, which is not specifically limited in the embodiment of the present disclosure.

It is noted that the terminal confirms that the user is expected to start the cooking equipment according to the pre-stored running mode if not detecting that the user selects no running mode when detecting the remote starting operation to the cooking equipment, and determines the pre-stored running mode as the running mode in which the cooking equipment is started.

In the embodiment of the present disclosure, the terminal may establish a binding relationship with the cooking equipment and pertinently control the cooking equipment through the binding relationship to avoid the cooking equipment being freely controlled to cause property loss or potential safety hazards. Wherein, the terminal may establish the binding relationship with the cooking equipment according to a user account, and a process may be as follows:

after the terminal establishes the connection with the cooking equipment, an equipment identifier of the cooking equipment and a user account for local login are acquired; and the equipment identifier of the cooking equipment and the user account are sent to a server, and the server binds the user account and the cooking equipment, that is, the server stores a corresponding relationship between the user account and the equipment identifier of the cooking equipment.

It is noted that the terminal may also establish the binding relationship with the cooking equipment through, besides the user account, own terminal identifier, which is not specifically limited in the embodiment of the present disclosure. In a binding relationship establishment process, a binding password may be set. In a process of rebinding the cooking equipment and another terminal, the binding password is required to be successfully verified for binding.

Step 302: the terminal generates a running instruction according to the acquired running mode, and sends the running instruction to the cooking equipment, the running instruction carrying the acquired running mode.

In the embodiment of the present disclosure, the terminal sends the running instruction to the cooking equipment through the connection with the cooking equipment.

Step 303: the cooking equipment runs according to the running mode carried in the running instruction after receiving the running instruction sent by the terminal.

The cooking equipment determines heating power and running duration in the running mode according to the running mode carried in the running instruction, runs according to the heating power and the running duration, and stops running when the running duration is reached.

Step 304: the current running mode is acquired if it is detected that a water level of the cooking equipment exceeds a preset water level during a running process of the cooking equipment, and a target running mode is determined according to the current running mode, heating power in the target running mode being less than the heating power in the current running mode.

In an implementation mode, the cooking equipment may detect that the water level exceeds the preset water level in a manner as follows: the cooking equipment may include a water level detection circuit, and the water level detection circuit includes a positive electrode terminal and a negative electrode terminal; the positive electrode terminal and the negative electrode terminal may be arranged in an inner wall of the cooking equipment, and when water or solution in the cooking equipment spills over both the positive electrode terminal and the negative electrode terminal, the water level detection circuit is switched on; and if detecting that the water level detection circuit is switched on, the cooking equipment determines that the water level of the cooking equipment exceeds the preset water level, wherein the positive electrode terminal and the negative electrode terminal may be arranged at the same height in the inner wall of the cooking equipment, and may also be arranged at different heights, which is not specifically limited in the embodiment of the present disclosure.

It is noted that another manner, besides the water level detection circuit for detecting that the water level exceeds the preset water level, may also be adopted to detect that the water level exceeds the preset water level, such as a sensor and an infrared manner, which is not specifically limited in the embodiment of the present disclosure.

The cooking equipment determines that overflow is about to occur in the cooking equipment when detecting that the water level exceeds the preset water level, and at this moment, for avoiding overflow of the cooking equipment, the cooking equipment may switch the current running mode to the target running mode in which the heating power is less for running. Wherein, the following manners may be adopted to determine the target running mode.

In some embodiments, the heating power in the current running mode is determined; and a running mode in which heating power is less than the heating power in the current running mode in a plurality of stored running modes is determined as the target running mode.

It is noted that each running mode of the cooking equipment corresponds to a piece of heating power and the cooking equipment may compare the heating power in the current running mode with the heating power in the other running modes to further determine the running mode in which the heating power is less than the heating power in the current running mode.

In some embodiments, a running mode to be switched corresponding to the current running mode in a stored mode switching list is determined according to the current running mode, and the running mode to be switched is determined as the target running mode.

Wherein, the mode switching list is configured to store a plurality of running modes and a running mode to be switched corresponding to each of the plurality of running modes. The mode switching list may be set in the cooking equipment when the cooking equipment is delivered, or may be acquired from the server or updated by the cooking equipment, which is not specifically limited in the embodiment of the present disclosure. Wherein, acquisition time for acquisition from the server may include the following time.

First, when being initialized, the cooking equipment acquires the mode switching list corresponding to own equipment identifier from the server through the connection with the server.

Second, after updating the mode switching list, the server transmits the updated mode switching list to the cooking equipment if detecting that the cooking equipment is connected with the server.

Third, the terminal triggers downloading operation to the mode switching list of the cooking equipment, the terminal sends a downloading request and the equipment identifier of the cooking equipment to the server, and the server sends the mode switching list corresponding to the equipment identifier of the cooking equipment to the cooking equipment.

It is noted that the target running modes in the first manner and the second manner may be the running stopping mode, i.e. a running mode in which heating power is zero, for lessing the water level of the cooking equipment to be less than the preset water level more rapidly when overflow is about to occur in the cooking equipment.

In the embodiment of the present disclosure, for enabling the user to timely learn about that overflow is about to occur in the cooking equipment to enhance controllability of the cooking equipment for the user before overflow occurs to the cooking equipment, the cooking equipment may also send a prompt to the terminal, the terminal displays the prompt, and the user learns about that overflow is about to occur in the cooking equipment through the prompt displayed by the terminal. Specifically, the following Step 1 and Step 2 are included.

Step 1: the cooking equipment may generate the prompt in the running process when a preset condition is met, and send the prompt to the terminal, and the prompt is used to prompt the user that the cooking equipment is about to overflow.

Wherein, under different preset conditions, the prompt has different specific contents and prompting functions, as will be detailed below.

In some embodiments, the preset condition is that the water level of the cooking equipment exceeds the preset water level, the prompt is a first message that reminds the user to check the cooking equipment.

Under such a condition, the water level of the cooking equipment may exceed the preset water level for the first time, a reason why overflow is about to occur may be excessive water in the cooking equipment. At this moment, it may not be determined whether the user selects a wrong running mode or not, so that it needs to prompt the user to check the cooking equipment. A content of the check prompting information may be, for example, "water is about to flow over the cooking equipment, please check whether you add too much water or not", which is not specifically limited in the embodiment of the present disclosure.

In some embodiments, when the preset condition is that the number of times that the water level is detected to exceed the preset water level exceed a preset threshold value within a preset time period, the prompt is a second message carrying the current running mode and mode switching prompting information.

Under such a condition, the water level of the cooking equipment exceeds the preset water level for many times, and this condition may be because the user selects the wrong running mode, so it needs to prompt the user to switch the current running mode of the cooking equipment. A content of the mode switching prompting information may be, for example, "water is about to flow over the cooking equipment, please make sure whether the current running mode is correctly set or not", which is not specifically limited in the embodiment of the present disclosure.

Wherein, the preset threshold value may be preset or modified by the server, or may be preset or modified by the user through the terminal, which is not specifically limited in the embodiment of the present disclosure.

Step 2: the terminal receives the prompt from the cooking equipment, and displays the prompt.

Specifically, for different prompts sent by the cooking equipment, the terminal may display the prompt as detailed below.

In some embodiments, the prompt is the first message, the check prompting information carried in the first message is displayed.

In some embodiments, when the prompt is the second message, the current running mode and mode switching prompting information carried in the second message are displayed. if a setting operation by the user to the running mode is detected, the target running mode selected by the user is acquired; a mode setting instruction is generated according to the target running mode, the mode setting instruction carrying the target running mode; and the mode setting instruction is sent to the cooking equipment to switch the cooking equipment from the current running mode to the target running mode according to the received mode setting instruction.

Furthermore, the terminal may also determine the target running mode in which the heating power is less than the heating power in the current running mode according to the current running mode, and such a process is similar to the abovementioned determination manner for the target running mode, and will not be elaborated herein. After the target running mode is determined, the selectable target running mode is displayed to the user, so that the user may execute the setting operation to the running mode more conveniently, meanwhile, the heating power in the running mode selected by the user is ensured to be less than that in the current running mode of the cooking equipment, acquisition accuracy of the target running mode is improved, and a purpose of avoiding overflow of the cooking equipment is further achieved.

It is noted that the cooking equipment may further produce an alarm prompting sound when overflow is about to occur, and the alarm prompting sound may be set when the cooking equipment is delivered, and may also be preset or modified by the server or the terminal, which is not specifically limited in the embodiment of the present disclosure.

Step 305: the cooking equipment switches the current running mode to the target running mode.

In the embodiment of the present disclosure, overflow is about to occur in the cooking equipment only because the user sets an improper rice-water proportion of the cooking equipment, and the current running mode of the cooking equipment is an expected running mode of the user. Under such a condition, in order to meet a practical food cooking requirement of the user, the cooking equipment may be switched back to the original running mode to ensure that the running mode of the cooking equipment meets the practical requirement of the user after being switched to the target running mode, and a specific process may be as follows: after the cooking equipment switches the current running mode to the target running mode for running, when it is detected that the water level drops below the preset water level, the cooking equipment is switched from the target running mode back to the original running mode for running. The cooking equipment runs in the current running mode which is a dominant mode, and is switched to the running mode in which the heating power is less for running only when overflow is about to occur, so that the practical cooking requirement of the user is met, and meanwhile, the purpose of avoiding overflow of the cooking equipment is achieved.

In an implementation mode, the cooking equipment may detect that the water level drops below the preset water level in a manner as follows: when the water level detection circuit of the cooking equipment is switched from an on state to an off state, it is determined that the water level drops below the preset water level. In addition, another manner may also be adopted to detect that the water level drops below the preset water level, such as a sensor and an infrared manner, which is not specifically limited in the embodiment of the present disclosure.

In another embodiment, since the cooking equipment has heated food therein for a certain period of time according to the original running mode when the cooking equipment is switched to the target running mode, if the cooking equipment runs for indicated time to heat the food in the target running mode at this moment, the food may be overcooked, the mouth-feel of the food may further be influenced, and even the food is burnt and unedible for the user. In order to avoid such a condition, the cooking equipment may also re-determine a running duration in the target running mode, and a specific process may be as follows:

a first running duration that the cooking equipment has run in the current running mode and a second running duration indicated by the target running mode are acquired; and a difference between the second running duration and the first running duration is determined as a third running duration. After then, running is stopped if a running duration reaches the third running duration during a process of running in the target running mode.

It is noted that to enable the user to know a working state of the cooking equipment in real time to better manage the cooking equipment, the cooking equipment may further send own working state to the terminal and the terminal receives and displays the working state of the cooking equipment for the user to check, specifically including the following steps:

Step 1: the cooking equipment acquires own working state;

Step 2: the cooking equipment sends the working state to the terminal;

Step 3: the terminal receives the working state of the cooking equipment, and generates working state prompting information on the basis of the working state; and Step 4: the terminal displays the working state prompting information.

Wherein, the cooking equipment may monitor own working state in real time, the working state including an idle state, a normal running state and a failure state, wherein the normal running state may include the current running mode of the cooking equipment. The failure state may include a normal heating incapability of the cooking equipment and the like, which is not specifically limited in the embodiment of the present disclosure.

Wherein, the working state prompting information may be preset or modified by the terminal of the user according to different working states, which is not specifically limited in the embodiment of the present disclosure.

According to the method provided by the embodiment of the present disclosure, when the water level of the cooking equipment exceeds the preset water level, that is, overflow is about to occur in the cooking equipment, the running mode in which the heating power is less than the heating power in the current running mode is adopted for running, so that a purpose of avoiding overflow of the cooking equipment is achieved, and adjustability of the running mode is high. Furthermore, when overflow is about to occur in the cooking equipment, the prompt may be displayed to the user, so that the user may timely learn about the state of the cooking equipment and execute switching operation to the running mode of the cooking equipment to further switch the running mode of the cooking equipment, so that the purpose of avoiding overflow is achieved, and controllability of the cooking equipment is improved.

Figure 4A:
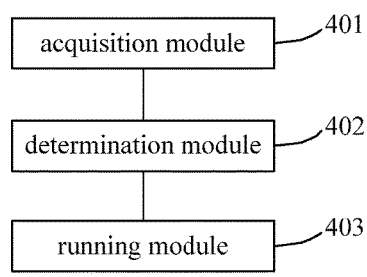
FIG. 4A is a block diagram of a cooking equipment running device, according to an exemplary embodiment.

FIG. 4A is a block diagram of a cooking equipment running device, according to an exemplary embodiment. Referring to FIG. 4A, the device includes an acquisition module 401, a determination module 402 and a running module 403.

Wherein, the acquisition module 401 is connected with the determination module 402, and is configured to acquire a current running mode if it is detected that a water level of cooking equipment exceeds a preset water level during a running process of the cooking equipment; the determination module 402 is connected with the running module 403, and is configured to determine a target running mode according to the current running mode, heating power in the target running mode being less than heating power in the current running mode; and the running module 403 is configured to switch the current running mode to the target running mode.

In a possible implementation mode, the determination module 402 is configured to determine the heating power in the current running mode, and determine a running mode in which heating power is less than the heating power in the current running mode in a plurality of stored running modes as the target running mode.

Alternatively, the determination module 402 is configured to determine, from a stored mode switching list, a running mode to be switched corresponding to the current running mode according to the current running mode; and determine the running mode to be switched as the target running mode, and the mode switching list is configured to store a plurality of running modes and a running mode to be switched corresponding to each of the plurality of running modes.

Figure 4B:
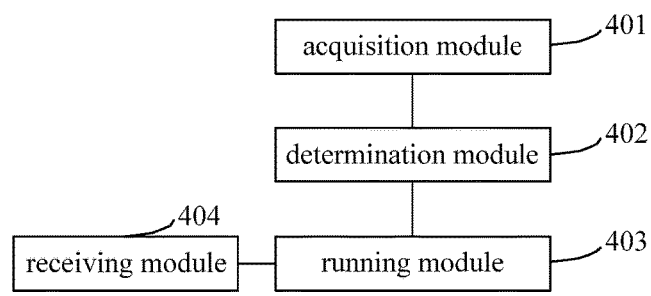
FIG. 4B is a block diagram of a cooking equipment running device, according to an exemplary embodiment.

In a possible implementation mode, referring to FIG. 4B, the device further includes:

a receiving module 404 configured to receive a running instruction sent by a terminal, the running instruction carrying a running mode for instructing the cooking equipment to start; and the running module 403 is further configured to enable the cooking equipment to run in the running mode.

Figure 4C:
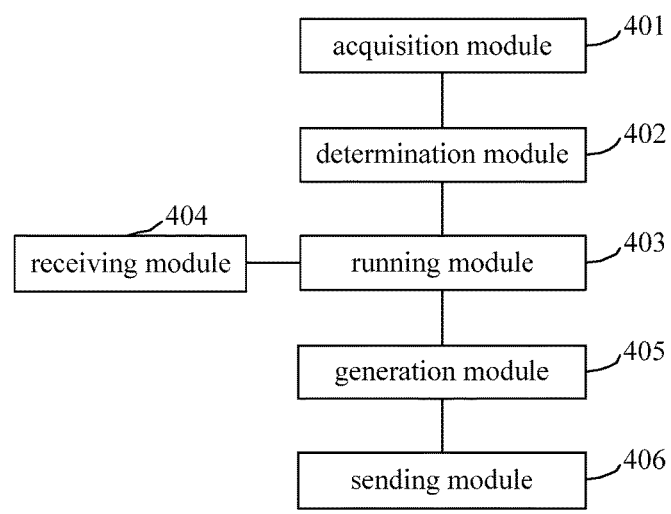
FIG. 4C is a block diagram of a cooking equipment running device, according to an exemplary embodiment.

In a possible implementation mode, referring to FIG. 4C, the device further includes:

a generation module 405 configured to generate a prompt that reminds a user that the cooking equipment is about to overflow when a preset condition is met; and a sending module 406 configured to send the prompt to the terminal.

In a possible implementation mode, when the preset condition is that the water level exceeds the preset water level, the prompt is a first message that remind the user to check the cooking equipment. Alternatively, when the preset condition is that the number of times that the water level is detected to exceed the preset water level exceeds a preset threshold value within a preset time period, the prompt is a second message carrying the current running mode and mode switching prompting information.

In a possible implementation mode, the receiving module 404 is further configured to receive a mode setting instruction of the terminal, the mode setting instruction carrying the target running mode and the mode setting instruction being generated by the terminal according to a setting operation by the user; and the running module 403 is further configured to switch the current running mode to the target running mode according to the mode setting instruction.

In a possible implementation mode, the acquisition module 401 is configured to acquire a working state of the cooking equipment, the working state including an idle state, a normal running state and a failure state and the normal running state including the current running mode of the cooking equipment; and the sending module 406 is further configured to send the working state to the terminal.

In a possible implementation mode, the terminal has a binding relationship with the cooking equipment.

In a possible implementation mode, the running module 403 is further configured to switch the cooking equipment from the target running mode back to the original running mode for running when it is detected that the water level drops below the preset water level.

In a possible implementation mode, the acquisition module 401 is configured to acquire a first running duration that the cooking equipment has run in the current running mode and a second running duration indicated by the target running mode; the determination module 402 is configured to determine a difference between the second running duration and the first running duration as a third running duration; and the running module 403 is further configured to stop running if a running duration reaches the third running duration during a process of running in the target running mode.

According to the device provided by the embodiment of the present disclosure, when the water level of the cooking equipment exceeds the preset water level, that is, overflow is about to occur in the cooking equipment, the running mode in which the heating power is less than the heating power in the current running mode is adopted for running, so that a purpose of avoiding overflow of the cooking equipment is achieved, and adjustability of the running mode is high.

Figure 5A:
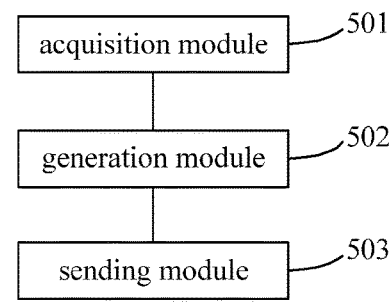
FIG. 5A is a block diagram of a cooking equipment running device, according to an exemplary embodiment.

FIG. 5A is a block diagram of a cooking equipment running device, according to an exemplary embodiment. Referring to FIG. 5A, the device includes an acquisition module 501, a generation module 502 and a sending module 503.

Wherein, the acquisition module 501 is connected with the generation module 502, and is configured to acquire a running mode when a remote starting operation to cooking equipment is detected; the generation module 502 is connected with the sending module 503, and is configured to generate a running instruction according to the running mode, the running instruction carrying the running mode; and the sending module 503 is configured to send the running instruction to the cooking equipment for the cooking equipment to run in the running mode.

In a possible implementation mode, the acquisition module 501 is configured to acquire, in a plurality of stored running modes, a running mode selected by a user; or, acquire a pre-stored running mode.

Figure 5B:
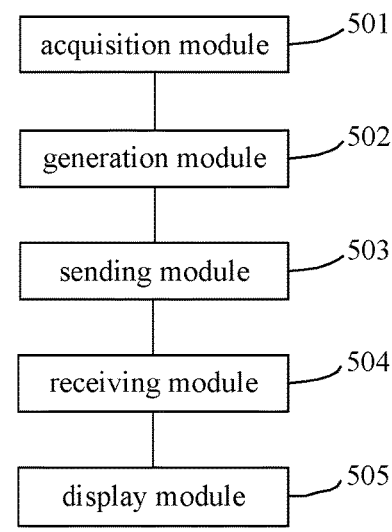
FIG. 5B is a block diagram of a cooking equipment running device, according to an exemplary embodiment.

In a possible implementation mode, referring to FIG. 5B, the device further includes:

a receiving module 504 configured to receive, from the cooking equipment, a prompt that reminds the user that the cooking equipment is about to overflow; and a display module 505 configured to display the prompt.

In a possible implementation mode, the prompt is a first message that reminds the user to check the cooking equipment, and the display module is further configured to display the prompt when the prompt is received.

In a possible implementation mode, the prompt is a second message that carries the current running mode of the cooking equipment and mode switching prompting information, and the display module is further configured to display the current running mode and the mode switching prompting information when the prompt is received;

the acquisition module 501 is further configured to acquire a target running mode selected by the user when a setting operation by the user to the running mode is detected;

the generation module 502 is further configured to generate a mode setting instruction according to the target running mode, the mode setting instruction carrying the target running mode; and the sending module 503 is further configured to send the mode setting instruction to the cooking equipment for the cooking equipment to switch to the target running mode according to the mode setting instruction and to run in the target running mode.

In a possible implementation mode, the receiving module 504 is further configured to receive a working state of the cooking equipment; the generation module is further configured to generate working state prompting information on the basis of the working state; and the display module is further configured to display the working state prompting information.

In a possible implementation mode, the cooking equipment has a binding relationship with a terminal.

According to the device provided by the embodiment of the present disclosure, the running instruction is sent to the cooking equipment to control the running mode of the cooking equipment, so that controllability of the cooking equipment is improved. Furthermore, when overflow is about to occur in the cooking equipment, the prompt may be displayed to the user to prompt the user to switch the running mode of the cooking equipment, and the running mode selected by the user is sent to the cooking equipment to switch the cooking equipment to the mode selected by the user, so that a purpose of avoiding overflow of the cooking equipment is achieved.

With respect to the devices in the above embodiments, the specific manners for performing operations for individual modules therein have been described in detail in the embodiments regarding the methods, which will not be elaborated herein.

Figure 6:
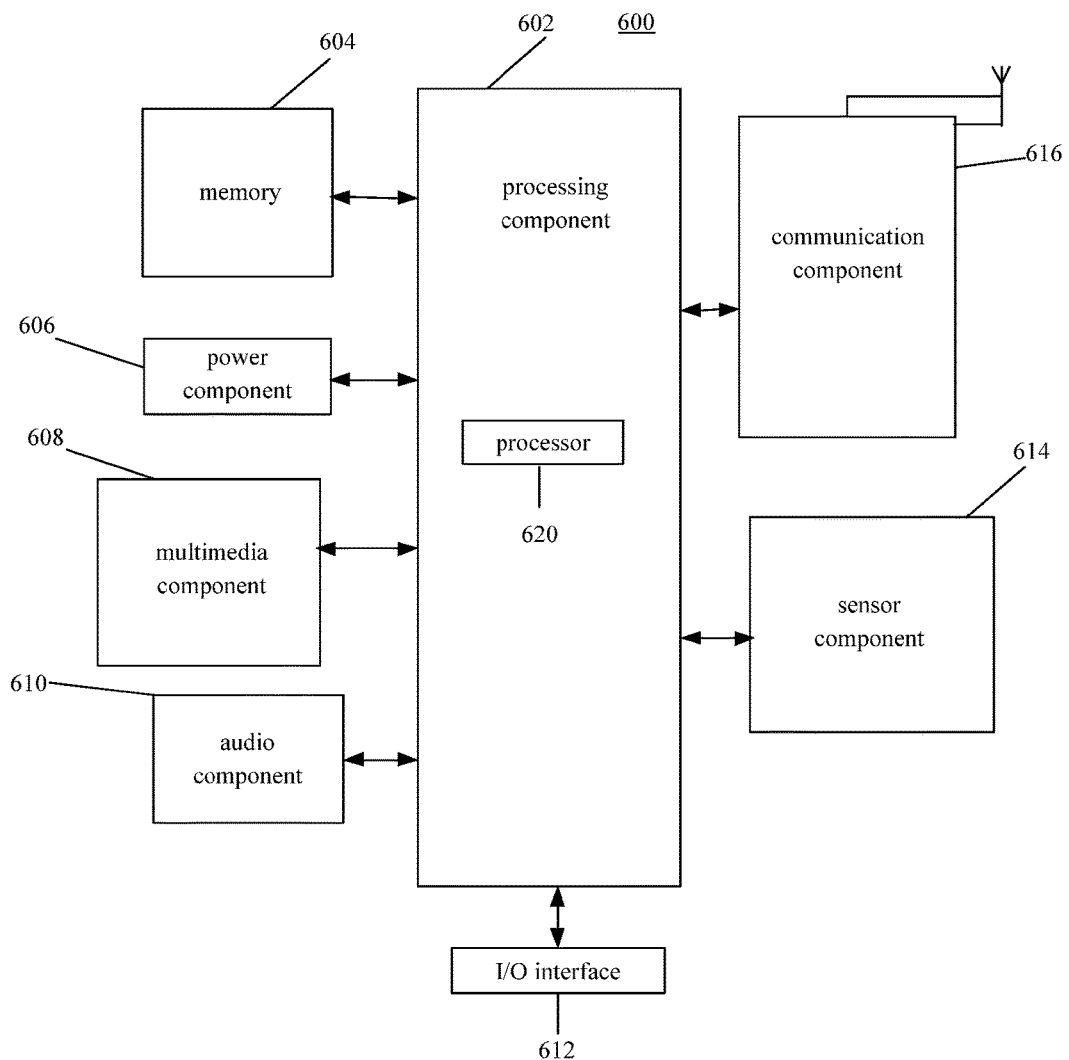
FIG. 6 is a block diagram of a cooking equipment running device, according to an exemplary embodiment.

FIG. 6 is a block diagram of a cooking equipment running device, according to an exemplary embodiment. For example, the device 600 may be a mobile phone, a computer, a digital broadcast terminal, a messaging device, a gaming console, a tablet, a medical device, exercise equipment, a personal digital assistant and the like.

Referring to FIG. 6, the device 600 may include one or more of the following components: a processing component 602, a memory 604, a power component 606, a multimedia component 608, an audio component 610, an Input/Output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the abovementioned method. Moreover, the processing component 602 may include one or more modules which facilitate interaction between the processing component 602 and the other components. For instance, the processing component 602 may include a multimedia module to facilitate interaction between the multimedia component 608 and the processing component 602.

The memory 604 is configured to store various types of data to support the operation of the device 600. Examples of such data include instructions for any application programs or methods operated on the device 600, contact data, phonebook data, messages, pictures, video, etc. The memory 604 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 606 provides power for various components of the device 600. The power component 606 may include a power management system, one or more power supplies, and other components associated with the generation, management and distribution of power for the device 600.

The multimedia component 608 includes a screen providing an output interface between the device 600 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 608 includes a front camera and/or a rear camera. The front camera and/or the rear camera may receive external multimedia data when the device 600 is in an operation mode, such as a photographing mode or a video mode. Each of the front camera and the rear camera may be a fixed optical lens system or have focusing and optical zooming capabilities.

The audio component 610 is configured to output and/or input an audio signal. For example, the audio component 610 includes a Microphone (MIC), and the MIC is configured to receive an external audio signal when the device 600 is in the operation mode, such as a call mode, a recording mode and a voice recognition mode. The received audio signal may be further stored in the memory 604 or sent through the communication component 616. In some embodiments, the audio component 610 further includes a speaker configured to output the audio signal.

The I/O interface 612 provides an interface between the processing component 602 and a peripheral interface module, and the peripheral interface module may be a keyboard, a click wheel, a button and the like. The button may include, but not limited to: a home button, a volume button, a starting button and a locking button.

The sensor component 614 includes one or more sensors configured to provide status assessment in various aspects for the device 600. For instance, the sensor component 614 may detect an on/off status of the device 600 and relative positioning of components, such as a display and small keyboard of the device 600, and the sensor component 614 may further detect a change in a position of the device 600 or a component of the device 600, presence or absence of contact between the user and the device 600, orientation or acceleration/deceleration of the device 600 and a change in temperature of the device 600. The sensor component 614 may include a proximity sensor configured to detect presence of an object nearby without any physical contact. The sensor component 614 may also include a light sensor, such as a Complementary Metal Oxide Semiconductor (CMOS) or Charge Coupled Device (CCD) image sensor, configured for use in an imaging application. In some embodiments, the sensor component 614 may also include an acceleration sensor, a gyroscope sensor, a magnetic sensor, a pressure sensor or a temperature sensor.

The communication component 616 is configured to facilitate wired or wireless communication between the device 600 and another device. The device 600 may access a communication-standard-based wireless network, such as a WiFi network, a 2nd-Generation (2G) or 3rd-Generation (3G) network or a combination thereof. In an exemplary embodiment, the communication component 616 receives a broadcast signal or broadcast associated information from an external broadcast management system through a broadcast channel. In an exemplary embodiment, the communication component 616 further includes an NFC module to facilitate short-range communication. For example, the NFC module may be implemented on the basis of a Radio Frequency Identification (RFID) technology, an Infrared Data Association (IrDA) technology, an Ultra-WideBand (UWB) technology, a BT technology and another technology.

In an exemplary embodiment, the device 600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned cooking equipment running method.

In an exemplary embodiment, there is also provided a non-transitory computer-readable storage medium including an instruction, such as the memory 604 including an instruction, and the instruction may be executed by the processor 620 of the device 600 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

In an exemplary embodiment, there is also provided a non-transitory computer-readable storage medium, an instruction in which being executed by a processor of a terminal to enable the terminal to execute the abovementioned cooking equipment running method.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A cooking equipment running method, comprising:
    acquiring a current running mode when detecting that a water level of cooking equipment exceeds a preset water level during a running process of the cooking equipment;
    determining a target running mode according to the current running mode, heating power in the target running mode being less than heating power in the current running mode;
    acquiring a first running duration that the cooking equipment has run in the current running mode and a second running duration indicated by the target running mode;
    determining a difference between the second running duration and the first running duration as a third running duration;
    switching the current running mode to the target running mode; and
    stopping running if a running duration reaches the third running duration during a process of running in the target running mode.

2. The method according to claim 1, wherein determining the target running mode according to the current running mode comprises:
    determining the heating power in the current running mode; and
    determining, from a plurality of stored running modes, a running mode in which heating power is less than the heating power in the current running mode as the target running mode.

3. The method according to claim 1, wherein determining the target running mode according to the current running mode comprises:
    determining, from a stored mode switching list, a running mode to be switched corresponding to the current running mode according to the current running mode, the mode switching list being configured to store a plurality of running modes and a running mode to be switched corresponding to each of the plurality of running modes; and
    determining the running mode to be switched as the target running mode.

4. The method according to claim 1, further comprising:
    receiving a running instruction sent by a terminal, the running instruction carrying a running mode for instructing the cooking equipment to start in the running node; and
    enabling the cooking equipment to run in the running mode.

5. The method according to claim 1, further comprising:
    generating a prompt for reminding a user that the cooking equipment is about to overflow when a preset condition is met; and
    sending the prompt to a terminal.

6. The method according to claim 5, wherein the preset condition is that the water level exceeds the preset water level, and the prompt is a first message that reminds the user to check the cooking equipment.

7. The method according to claim 5, wherein the preset condition is that the number of times that the water level is detected to exceed the preset water level exceed a preset threshold value within a preset time period, and the prompt is a second message that carries the current running mode and mode switching prompting information.

8. The method according to claim 5, after sending the prompt to the terminal, the method further comprising:
    receiving a mode setting instruction carrying the target running mode, the mode setting instruction being generated by the terminal according to a setting operation by the user; and
    switching the current running mode to the target running mode according to the mode setting instruction.

9. The method according to claim 1, further comprising:
    acquiring a working state of the cooking equipment, the working state comprising an idle state, a normal running state and a failure state, and the normal running state comprising the current running mode of the cooking equipment; and
    sending the working state to the terminal.

10. The method according to claim 4, wherein the terminal has a binding relationship with the cooking equipment.

11. The method according to claim 1, after switching the current running mode to the target running mode, the method further comprising:
    switching the cooking equipment from the target running mode back to the current running mode when detecting that the water level drops below the preset water level.

12. A cooking equipment running method, comprising:
    acquiring a running mode when a remote starting operation to the cooking equipment is detected;
    generating a running instruction according to the running mode, the running instruction carrying the running mode;

sending the running instruction to the cooking equipment for the cooking equipment to run in the running mode, the running mode being a current running mode;

determining a running mode in which heating power is less than heating power in the current running mode as a target running mode when a water level of the cooking equipment exceeds a preset water level;

determining a first running duration that the cooking equipment has run in the current running mode and a second running duration indicated by the target running mode;

determining a difference between the second running duration and the first running duration as a third running duration;

controlling the cooking equipment to switch from the current running mode to the target running mode; and controlling the cooking equipment to stop running if a running duration reaches the third running duration during a process of running in the target running mode.

13. The method according to claim 12, wherein acquiring the running mode comprises:

acquiring, in a plurality of stored running modes, a running mode selected by a user.

14. The method according to claim 12, wherein acquiring the running mode comprises:

acquiring a pre-stored running mode.

15. The method according to claim 12, further comprising:

receiving, from the cooking equipment, a prompt for reminding the user that the cooking equipment is about to overflow; and displaying the prompt.

16. The method according to claim 15, wherein the prompt is a first message that reminds the user to check the cooking equipment.

17. The method according to claim 15, wherein the prompt is a second message that carries the current running mode of the cooking equipment and mode switching prompting information; and wherein the method further comprises:

displaying the current running mode and the mode switching prompting information when the prompt is received;

acquiring a target running mode selected by the user when a setting operation by the user to the running mode is detected;

generating a mode setting instruction according to the target running mode, the mode setting instruction carrying the target running mode; and sending the mode setting instruction to the cooking equipment for the cooking equipment to switch to the target running mode according to the mode setting instruction.

18. The method according to claim 12, further comprising:

receiving a working state of the cooking equipment;

generating working state prompting information on the basis of the working state; and displaying the working state prompting information.

19. A cooking equipment running device, comprising:

a processor; and a memory configured to store instructions executable by the processor, wherein the processor is configured to:

acquire a current running mode when detecting that a water level of cooking equipment exceeds a preset water level during a running process of the cooking equipment;

determine a target running mode according to the current running mode, heating power in the target running mode being less than heating power in the current running mode;

acquire a first running duration that the cooking equipment has run in the current running mode and a second running duration indicated by the target running mode;

determine a difference between the second running duration and the first running duration as a third running duration;

switch the current running mode to the target running mode; and stop running if a running duration reaches the third running duration during a process of running in the target running mode.

* * * * *